US011928846B2

(12) United States Patent
Lindstedt et al.

(10) Patent No.: US 11,928,846 B2
(45) Date of Patent: Mar. 12, 2024

(54) PRESENCE AND ABSENCE DETECTION

(71) Applicant: Essity Hygiene and Health Aktiebolag, Gothenburg (SE)

(72) Inventors: Daniel Lindstedt, Lund (SE); Maria Zevgren Sundberg, Gothenburg (SE); Annie Thorburn, Ellos (SE); Maciej Walesiak, Warsaw (PL)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 596 days.

(21) Appl. No.: 17/056,084

(22) PCT Filed: May 18, 2018

(86) PCT No.: PCT/EP2018/063102
§ 371 (c)(1),
(2) Date: Nov. 17, 2020

(87) PCT Pub. No.: WO2019/219206
PCT Pub. Date: Nov. 21, 2019

(65) Prior Publication Data
US 2021/0209790 A1    Jul. 8, 2021

(51) Int. Cl.
G06V 10/143    (2022.01)
G01J 1/42      (2006.01)
(Continued)

(52) U.S. Cl.
CPC .............. *G06V 10/143* (2022.01); *G01J 1/42* (2013.01); *G06T 7/73* (2017.01); *G06V 20/52* (2022.01);
(Continued)

(58) Field of Classification Search
CPC ... G01J 1/42; G06F 18/00; G06T 7/73; G06T 2207/20024; G06T 2207/30196; G06T 2207/30232; G06V 10/143; G06V 20/52
See application file for complete search history.

(56) References Cited

U.S. PATENT DOCUMENTS 4,799,243 A    1/1989  Zepke
4,912,748 A    3/1990  Horii et al.
(Continued)

FOREIGN PATENT DOCUMENTS

CN    106600777 A    4/2017
EP      3287755 A1   2/2018
(Continued)

OTHER PUBLICATIONS

New Zealand Intellectual Property Office, Patent examination report 1, Application No. 769916, dated Oct. 29, 2021 (3 pages).
(Continued)

Primary Examiner — Mark R Gaworecki
(74) Attorney, Agent, or Firm — CANTOR COLBURN LLP

(57) ABSTRACT

A method is provided for detecting presence and absence of a creature. The method includes, receiving an input signal from a radiation sensor; applying a first low-pass filter to the received input signal with a first time constant and generating a first filter output; applying a second low-pass filter to the received input signal with a second time constant and generating a second filter output. The method also includes determining a presence of a creature by comparing a slope of the first filter output to a predetermined value; and determining an absence of the creature based on further processing. A corresponding device for detecting presence and absence of a creature is also provided.

18 Claims, 2 Drawing Sheets

(51) Int. Cl.
*G06T 7/73* (2017.01)
*G06V 20/52* (2022.01)

(52) U.S. Cl.
CPC .............. *G06T 2207/20024* (2013.01); *G06T 2207/30196* (2013.01); *G06T 2207/30232* (2013.01)

(56) References Cited

U.S. PATENT DOCUMENTS

| | | | |
|---|---|---|---|
| 6,384,414 | B1 | 5/2002 | Fisher et al. |
| 9,217,672 | B2 | 12/2015 | Schilz et al. |
| 9,395,248 | B2 | 7/2016 | Schmidt |
| 9,410,848 | B2 | 8/2016 | Schilz et al. |
| 9,696,457 | B1 * | 7/2017 | Mattes .................. G01J 5/0025 |
| 2003/0183767 | A1 | 10/2003 | Meunier et al. |
| 2004/0021552 | A1 | 2/2004 | Koo |
| 2004/0114054 | A1 | 6/2004 | Mansfield et al. |
| 2006/0291695 | A1 | 12/2006 | Lipton et al. |
| 2010/0102760 | A1 | 4/2010 | Reid et al. |
| 2012/0086810 | A1 | 4/2012 | Messerschmid |
| 2014/0002667 | A1 | 1/2014 | Cheben et al. |
| 2014/0264035 | A1 | 9/2014 | Kleihorst et al. |
| 2015/0294513 | A1 | 10/2015 | Kim |
| 2016/0110614 | A1 | 4/2016 | Honda |
| 2016/0335552 | A1 | 11/2016 | Longo et al. |

FOREIGN PATENT DOCUMENTS

| | | |
|---|---|---|
| GB | 2080540 A | 2/1982 |
| JP | H11110601 A | 4/1999 |
| JP | 3792752 B2 | 7/2006 |
| KR | 101093215 B1 | 12/2011 |
| WO | 2014012070 A1 | 1/2014 |
| WO | 2015112517 A1 | 7/2015 |
| WO | 2019219206 A1 | 11/2019 |

OTHER PUBLICATIONS

Australian Government, IP Australia, Examination report No. 1 for standard patent application, Application No. 2018423679, dated Jul. 20, 2021 (3 pages).

National Institute of Industrial Property (Chile), Office Action, Application No. 2020002607, dated Jul. 20, 2021 (12 pages).

Intellectual Property India, Examination Report, Application No. 202017052568, dated Sep. 23, 2021 (6 pages).

Canadian Intellectual Property Office, Office Action, Application No. 3,095,327, dated Oct. 14, 2021 (3 pages).

Federal Service for Intellectual Property (Rospatent), Decision To Grant A Patent For Invention, Russian Application No. 2020138557/28(071384), dated Jul. 1, 2021 (22 pages).

European Application No. 18726439.5-1207; Communication pursuant to Article 94(3) EPC dated Jan. 13, 2023; 6 pages.

Australian Application No. 2018423679; Examination Report No. 2 for standard patent application dated Apr. 12, 2022; 3 pages.

International Searching Authority, Search Report and Written Opinion issued in PCT/EP2018/063102 dated Feb. 11, 2019 (12 pages).

Office Action issued in Colombian Patent Application No. NC2020/0015821; Application Filing Date Aug. 8, 2016; dated Jul. 24, 2023 (10 pages).

Mexican Institute of Industrial Property, Office Action, Application No. MX/a/2020/012325, dated Nov. 10, 2023 (5 pages).

* cited by examiner

PRESENCE AND ABSENCE DETECTION

CROSS-REFERENCE TO RELATED APPLICATION

This application is a national phase entry of, and claims priority to, International Application No. PCT/EP2018/063102, filed May 18, 2018. The above-mentioned patent application is incorporated herein by reference in its entirety.

TECHNICAL FIELD

This application relates to detecting a presence and an absence of a creature (e.g., human or animal) or other warm object in the sense that such an object radiates heat. More particularly, this application relates to counting e.g., humans in some given environment, including but not limited to, restrooms, bathrooms, toilets, public toilets and the like.

BACKGROUND

In the conventional arts there are known various techniques to detect the presence of humans and to count the number of human users at a specific location. Thereby, the employed devices are usually designed to disregard non-human objects, since the main interest lies indeed in determining whether or not there is a human present or absent and/or in determining a sort of a head count of humans entering a room, using a facility, being in some environment, and/or passing by a given point. The same, however, may apply to creatures in general or even to objects that may generate heat but at least radiate heat.

Traditional techniques for example employ passive infra-red motion detection using a differential pyroelectric sensor (i.e. pyroelectric infrared sensors="PIR" sensors) for detection of human presence and/or absence. The mentioned PIR sensors are relatively good at detecting human presence, but are relatively poor at detecting absence, and, as consequence, may not be suitable if accurate counting of people (humans) is required. One of the reasons causing this disadvantage is the circumstance that PIR sensors may require motion of a human object to detect a human in the first place. However, if there is no or only little motion by the human a presence and/or an absence cannot reliably be detected. Some conventional approaches consider a timer, which attempts to perform presence determination. For example, at a first detected motion a timer is started, and if a second motion is detected before the timer has run out, the time will reset to its starting value and presence is still kept. But if no motion is detected before the timer expires, absence is determined. This solution may introduce two other problems in that either the timer is too short and one human staying inside a field of view ("FOV") will result in multiple presence determinations, or that the timer is too long and there is no absence detected between subsequent humans entering the FOV.

Further, there are a number of known methods that achieve rudimentary human presence detection using a thermopile sensor. However, also such conventional concepts suffer from various drawbacks. For example, one known method using a thermopile sensor is the fixed threshold approach which considers finding a fixed threshold in relation to the background radiation. Either the threshold is a constant value, or the threshold is found in relation to the background radiation at the moment the user enters the sensor's FOV. This fixed threshold approach may, however, fail when the background radiation varies as a result of, for example, solar radiation, daily and/or local temperature variations.

Another conventional approach considers measuring a total radiation in a usable wavelength range, outputting one or more values based on this radiation level and calibrating one of the values so that it corresponds to the temperature of a target object in the FOV. A raw value can then be filtered using two low pass filters, where there is provided one weak and fast filter and one stronger and thereby slower filter. Both these filters can be set at different values, but commonly the raw output is faster than the first filter output which, in turn, is faster than the second filter output. Presence can then be determined as the difference between either two of the values, i.e. if a faster filter displays a higher value than a slower filter. This method may then determine that presence is ended when the opposite happens, i.e. that the faster filtered value is less than the slower filtered value.

Although this method may adapt to slow changes due to drift, this approach may nevertheless suffer from the drawback that the time constant of the slower filter will eventually approach the faster filter and the difference as the basis for making a decision on determining presence/absence will become less and less. This circumstance may lead to a very slow filter that will not reach the faster filtered value during presence and a relatively fast filter once presence has been ended in order to be ready for the next user. Consequently, this method may fail if the presence periods are similar in time to the non-presence periods, which may be a very common case.

In addition to the above, several other problems remain. One problem arises when it is desirable that a presence detection sensor has a relatively wide FOV to cover some given environment. A wide FOV may lead to the fact that the human will be able to stand/sit at short range in the center of the FOV (leading to a strong signal) or in the fringe of the FOV (leading to a weak signal). Consequently, the human may also move between these positions within the FOV, which may lead to strong fluctuations in the signal. Another problem relates to the fact that the housing of the sensor device may be heated from the environment or the user body temperature and may also slowly radiate that heat again when cooling down. This problem may even get worse if materials transparent in the infrared ("IR") are employed as a housing of the sensor device or are located in front of the sensor.

There is therefore a need for improved concepts of detecting presence and absence and counting of creatures, animals, or people, e.g., humans, visiting a place, an environment, a room or passing by a given point. Specifically, there is a need for improved concepts that employ a radiation sensor for raw data generation and that are employed for detecting presence and absence and counting.

SUMMARY

The mentioned problems and other drawbacks are addressed by the subject-matter described herein.

According to one embodiment, there is provided a method for detecting presence and absence of a creature. The method includes the steps of receiving an input signal from a radiation sensor; applying a first low-pass filter to the received input signal with a first time constant and generating a first filter output; applying a second low-pass filter to the received input signal with a second time constant and generating a second filter output; determining a presence of a creature or heat radiating object by comparing a slope of the first filter output to a predetermined value; setting a first threshold based on the second filter output; decreasing the second time constant; increasing the second time constant; calculating a difference between said first threshold and the second filter output; adjusting said first threshold based on the second filter output; and determining an absence when the first filter output falls below said first threshold.

According to another embodiment, there is provided a device for detecting presence and absence of a creature or heat radiating object. The device includes processing resources that are adapted to receive an input signal from a radiation sensor; apply a first low-pass filter to the received input signal with a first time constant and to generate a first filter output; apply a second low-pass filter to the received input signal with a second time constant and to generate a second filter output; determine a presence of a creature or heat radiating object by comparing a slope of the first filter output to a predetermined value; set a first threshold based on the second filter output; decrease the second time constant; increase the second time constant; calculate a difference between said first threshold and the second filter output; adjust said first threshold based on the second filter output; and to determine an absence when the first filter output falls below said first threshold.

BRIEF DESCRIPTION OF THE DRAWINGS

The features and advantages of the invention will be appreciated upon reference to the following drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1B:
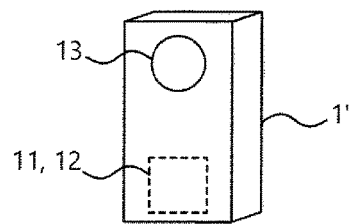
FIG. 1B is a perspective schematic view of another embodiment of a device of the present invention.
Figure 1A:
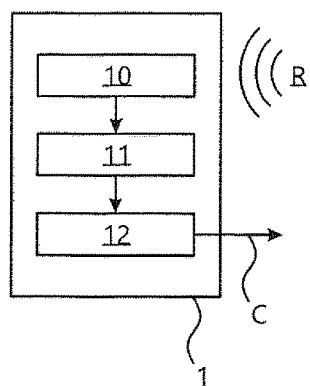
FIG. 1A is a schematic block diagram view of an embodiment of a device of the present invention.

FIG. 1A shows a schematic view of a general device embodiment of the present invention. Specifically, there is shown functionally a device 1 for detecting a presence and an absence of a creature which comprises a radiation sensor 10 configured to receive and detect radiation R from a creature target object. The radiation sensor 10 can be any one of an infrared sensor, a thermopile sensor, a camera, an optical sensor, and a temperature sensor. In general, the radiation sensor 10 is configured to detect heat from a creature which is transferred by heat radiation (infrared) and which practically ignores heat transfer by conduction.

The device 1 may also include a processing unit 11 which can also include or have access to a memory location that stores code in the form of instructions executable by said processing unit 11. In this way, the processing unit 11 can implement the desired functionalities including receiving an input signal from a radiation sensor, applying a first low-pass filter to the received input signal with a first time constant and generating a first filter output, applying a second low-pass filter to the received input signal with a second time constant and generating a second filter output; determining a presence of a creature by comparing a slope of the first filter output to a predetermined value, setting a first threshold based on the second filter output, decreasing the second time constant, increasing the second time constant, calculating a difference between said first threshold and the second filter output, adjusting said first threshold based on the second filter output, and determining an absence when the first filter output falls below said first threshold.

The device 1 may further comprise a communication unit 12 that is configured to receive input from the processing unit 11 and to generate and transmit a communication signal C to some receiving entity. For example, the processing unit 11 may generate data in relation to determined presence, absence and/or counting events which, in turn, triggers the communication unit 12 to generate and transmit a corresponding signal. In this way other entities can be provided with information based on the determination results obtained in the device 1.

In the above described embodiment, all these functionalities are implemented locally in the device 1. However and according to another embodiment of the present invention, some of the above mentioned functionalities can be implemented externally to the device 1 as, for example, in a remote computer (server, host), or in a network-, internet- and/or cloud-based processing resource. For this purpose, the processing unit 11 may be configured to only assist in generating data messages that the communication unit 12 can then transmit to such a remote location where then the remaining functionalities are implemented.

Figure 1C:
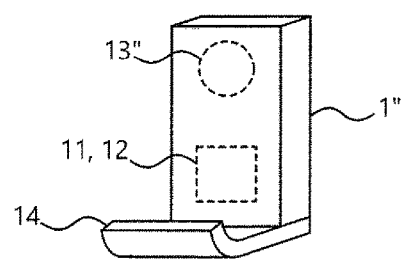
FIG. 1C is a perspective schematic view of another embodiment of a device of the present invention.

FIGS. 1B and 1C show schematic views of exemplary device embodiments of the present invention. As shown schematically in FIG. 1B, a device embodiment can consider a single device 1' with a housing and a radiation aperture 13 that allows radiation from a target to reach a sensor integrated in device 1'. The device 1' may again comprise a processing unit 11 and a communication unit 12 that implement some or all functions and the related transfer of data and signals. FIG. 1C shows a device embodiment in which the device 1" combines the functionalities according to the general embodiments of the present invention with a further, as such independent functionality. For example, the device 1' comprises a hook element 14 which allows the device 1" to function as a hook. Further, the aperture 13" may be implemented in a concealed fashion so as not to interfere too much with the design of the other functionality.

Figure 2:
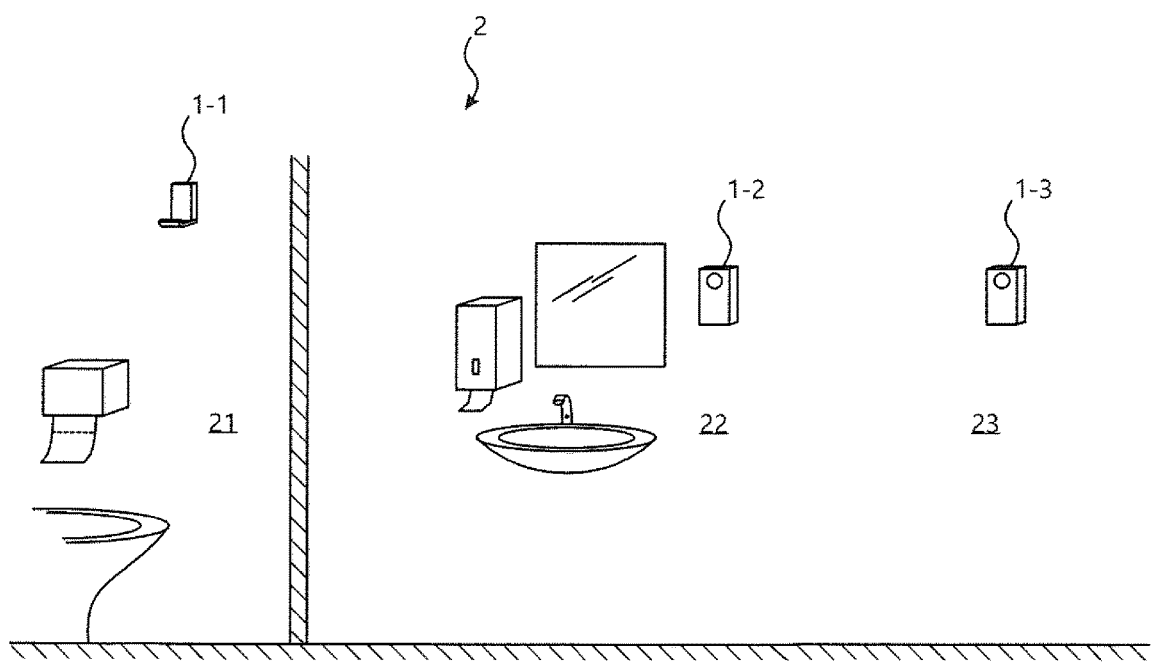
FIG. 2 is a schematic view of an exemplary operation environment according to an embodiment of the present invention.

FIG. 2 shows a schematic view of an exemplary operation environment of an embodiment of the present invention. As an example, there is shown an environment 2 of a restroom that—as usual—includes a toilet booth area 21, a hand wash area 22 and a general purpose area 23. Naturally, envisaged environments may have a similar configuration or may provide only one or two of the above-mentioned areas. However, the shown exemplary environment is provided with three devices 1-1, 1-2, and 1-3 for detecting presence and absence of a creature according to respective embodiments of the present invention. As shown, a first device 1-1 is located in and associated to the toilet booth area 21, a second device 1-2 is located in and associated to the hand wash area 22 and, a third device 1-3 is located in and associated to the general purpose area 23.

In an embodiment, the first device 1-1 is provided along the embodiment as explained in conjunction with FIG. 1C, namely, as a hook. In this way, the device 1-1 can account for the limited space usually available in related areas and can accomplish other tasks, such as carrying clothes, bags etc. of the (human) user of the facility. The device 1-1 may be installed for the purpose of monitoring times, instances, and/or counts related to the use of the toilet in the area 21. In this way, data relating to use counts and/or use patterns can be generated on the basis of the determined presence and absence. For example, conclusions can be drawn that relate to the necessity of maintenance of the facility, e.g., including the refill of consumables (tissues, toilet paper, disinfectants, deodorants, hygienic articles, and the like) and/or cleaning of the facilities. Similar motivations apply for the device 1-2 that is arranged in relation to the hand wash area 22.

The further device 1-3 that is installed and provided in conjunction with area 23 can serve for obtaining additional information. Specifically, the device 1-3 may be arranged in the vicinity of a door or access to the room 2. In this way, an overall count of people (humans) that enter, leave or generally use the facilities can be obtained. Furthermore, the device 1-3 may also be provided at a location which is suitable for detecting queuing people. Specifically, the device 1-3 can be configured to determine and/or count a number of individuals waiting to enter and use the toilet area 21 and/or hand wash area 22. The related data can be used for guiding people to alternative restrooms and/or the planning of resources, consumables, and/or maintenance.

Figure 3:
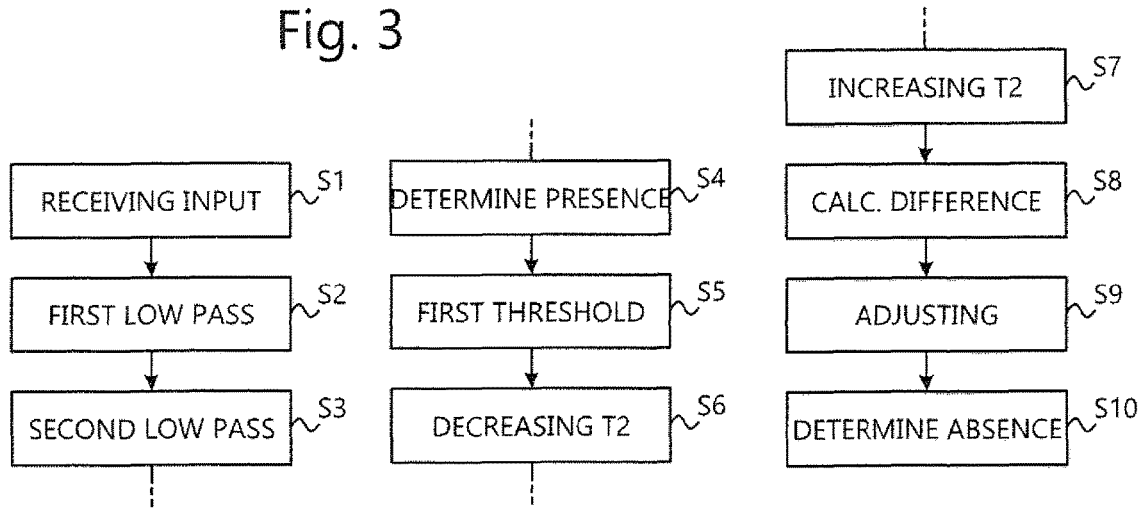
FIG. 3 is a flowchart illustrating one embodiment of a method of the present invention.

FIG. 3 shows a schematic view of possible values of raw and processed data in an embodiment of the present invention. This method embodiment is for detecting presence and absence of a creature or warm object and comprises the following steps: a step S1 of receiving an input signal from a radiation sensor; a step S2 of applying a first low-pass filter to the received input signal with a first time constant and generating a first filter output; a step S3 of applying a second low-pass filter to the received input signal with a second time constant and generating a second filter output; a step S4 of determining a presence of a human by comparing a slope of the first filter output to a predetermined value; a step S5 of setting a first threshold based on the second filter output; a step S6 of decreasing the second time constant; a step S7 of increasing the second time constant; a step S8 of calculating a difference between said first threshold and the second filter output; a step S9 of adjusting said first threshold based on the second filter output; and a step S10 of determining an absence when the first filter output falls below said first threshold.

Generally, it should be understood that some of the above mentioned steps are performed concurrently and/or in a different order. For example, steps S2 and S3 may be performed in another order or also concurrently, i.e. at the same time, with other steps of the general method embodiment. Specifically, the filter steps S2 and S3 may be implemented as filter routine loops that are executed continuously while, for example, a step S6 and/or S7 decreases or increases the time constant T2 of the second filter S3. Furthermore, there can be one or more optional steps such as a step of waiting for a predetermined time after the step S6 of decreasing the second time constant and or a step of waiting until the second filter output becomes equal to the first filter output within a predetermined tolerance after step S6. Generally, however, the inherent time that the employed processing unit takes to execute steps S6 and S7 may already be sufficient for the purpose of having the second filter output becoming equal to the first filter output within a predetermined tolerance.

In general, thermopile sensors as the employed sensor (e.g., sensor 10 as shown and explained in conjunction with FIG. 1A) may provide the advantage that no motion detection is necessary for detecting presence of humans as these sensors measure radiation in the sensor's field of view, utilizing, for example, a related infrared wavelength band at approximately 8-14 µm (known sensors include for example the thermopile components "CaliPile® TPiS 1S 1385" and "TPiS 1T 1086 L5.5" available from Excelitas Technologies® of Massachusetts). Such sensors may provide a wide field of view of approx. 120° and may therefore be used primarily for presence detection in relatively small rooms, while other types provide a focusing lens giving it a FOV in the range of 5.5°.

Figure 4A:
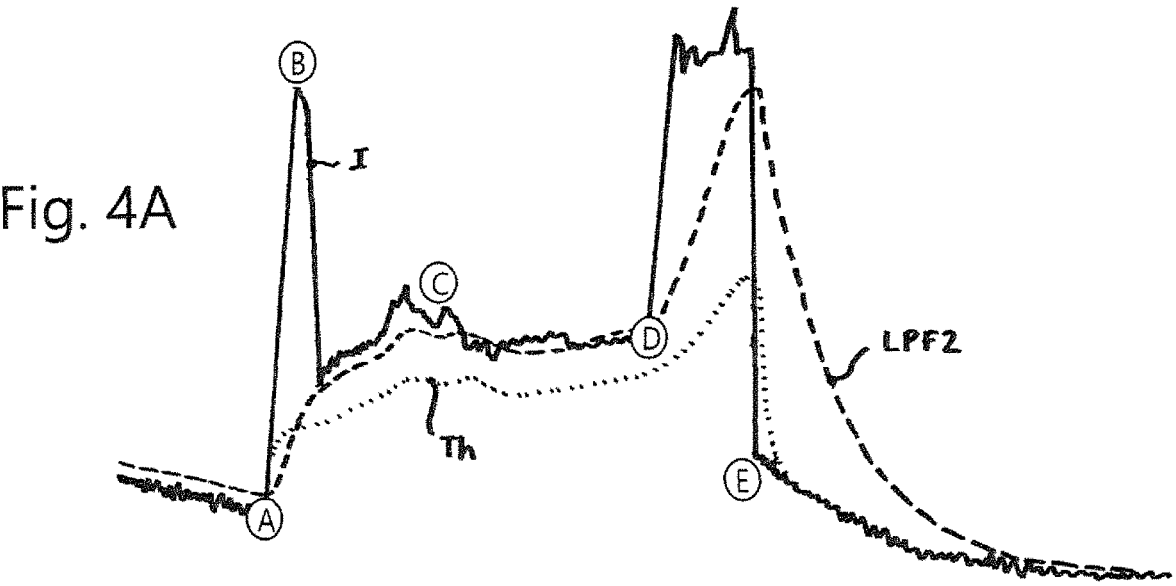
FIG. 4A is a graphical plot of possible values of raw and processed data occurring during operation of one embodiment of the present invention, specifically showing data when a user comes into a sensor's FOV and visits the corresponding environment.
Figure 4B:
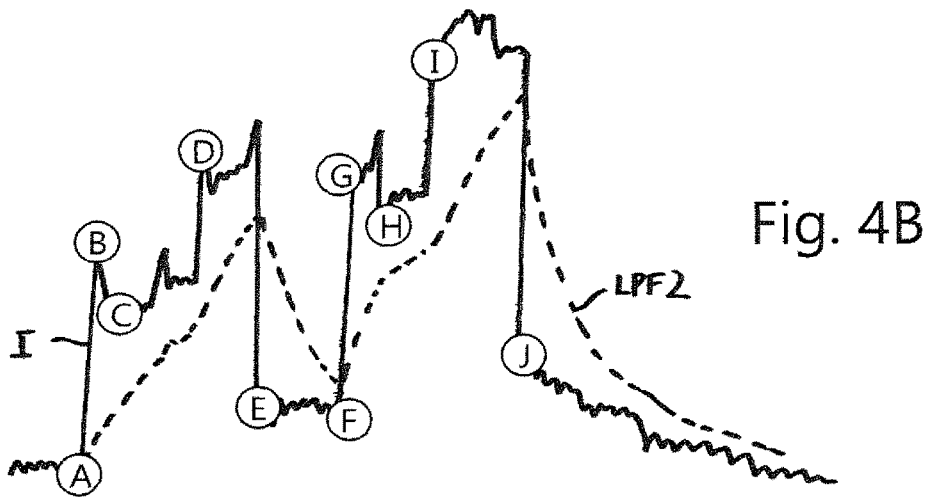
FIG. 4B is a graphical plot of possible values of raw and processed data occurring during operation of another embodiment of the present invention, specifically showing data when consecutive users visit a facility being monitored.

FIGS. 4A and 4B show schematic views of possible values of raw and processed data occurring during operation of a corresponding embodiment of the present invention. Specifically, the amplitude (in a.u. along the vertical direction) of a raw sensor output and some processed figures are drawn versus time along the horizontal direction (e.g., over a time span equaling 30 seconds for the drawn period). In the following, further detailed embodiments of the provided functionalities are disclosed and described where it is understood that any reference to the specific—but exemplary—shape and behavior of the related data values is only for illustrative but not limiting purposes. The skilled reader will appreciate that the shown actual data values depend on the specific use case and will of course vary during operation while, however, the functionalities of the embodiments of the present invention process the data accordingly.

In general, embodiments of the present invention provide a solution for being able to handle both slow drift and fast response to user interaction, i.e. presence and absence of humans. Initially, the system can be assumed to start in some idle state with all signals and values being in some default state. When, however, a human comes into the FOV of the employed sensor and this is detected by, for example, performing steps S1 to S4 as described in conjunction with FIG. 3, and considering the exemplary raw input I (solid line) from the radiation sensor as well as the output of the first low pass filter LPF1 (omitted in the Figure since it closely follows I). This generally implements also a kind of motion detection which can be faster and more responsive to quick changes, and which can be based on the slope of the first filter output LPF1 which can be generated by using a relatively fast response, i.e. a relatively small time constant T1. The fast filter output may result in a noisy signal, but a cover lens in front of the sensor can itself work as a low-pass filter due to material induced attenuation. In this way, it is generally envisaged to provide the device with a lens in front of the radiation sensor, wherein the lens causes fast fluctuations to be filtered out, i.e. also acts as some kind of low pass filter depending on the lens material properties and thickness.

As soon as this presence is detected and determined, the processing continues to the next step which can be performed locally or externally to the sensor and/or device (e.g., host). For this purpose, an interrupt can be thrown and/or a presence flag can be set. Then a threshold level Th is found on the basis of the LPF2 signal to which optionally a constant or otherwise predetermined offset is added to provide a sum. The LPF2 signal can be filtered slower than the LPF1 signal at this time.

The time constant T2 of the LPF2 signal can now be set to a relatively fast response, allowing it to reach the level of LPF1 in a short time (e.g., <2 s) within some given tolerance. This can be achieved by first decreasing and then increasing the second time constant T2 for the second low pass filter as described in conjunction with steps S6 and S7 of FIG. 3. During the approach of the filter values, the processing may not be fully functional for serving power. Advantageously, this can account for situations in which the signal is noisy. As soon as the LPF2 signal has stabilized (e.g., it may be within a predetermined tolerance range), the time constant T2 is again set back to slower response, i.e. T2 is increased. This allows for LPF2 to filter out noise and some fast movements by the human.

Now, the level of the LPF2 can be read, and the difference to the initial threshold found above can be recorded. This difference can be used as a reference for the difference between an actually assumed presence of a human and the background. A constant offset can be considered, and even if the threshold is increased due to drift (see also below) the difference to the initial threshold may be used as a reference.

As the method is now in state in which presence of a human is assumed, a next part of the method comes into play. Specifically, the threshold can be adjusted dynamically to drift and user activities. Specifically, LPF2 is used as an indication of the drift of the signal, and the threshold Th is adjusted accordingly. According to further embodiments this may additionally include not to set the threshold lower than the initial threshold found in the first place (see above) and/or limiting the threshold so that it does not increase at a rate higher than is plausible from drift induced from the surrounding environment (determined as number of counts per second). For example, if the human is standing very close to the sensor then the LPF2 signal will increase fast, but that fast increase need not to be transferred to the threshold. This limit in the rate of the threshold increase can be determined empirically and/or experimentally to provide a maximum value, and may to some extent take into account the material and housing of the device.

The signal level of LPF1 is then compared to the dynamic threshold, and if the value goes below the threshold the presence is judged to be finished (i.e. absence is determined, cf. step S10). The check whether LPF1 is below the dynamic threshold Th and the update of the dynamic threshold can be performed at various (and to some extent random or periodic) intervals, that may be defined by a number of different actions, such as interrupts arising from strong signal changes, actions from remaining parts of the system to wake up for, e.g., initiating radio communication, a timer that maximizes the sleep cycle to e.g., 8 seconds, implying that if one of the other mentioned events do not occur within some time the timer will ensure values are checked at some minimum interval.

Once it has been determined that the presence criteria is no longer fulfilled, the time constant T2 of the second low pass filter (LPF2) can be again set to a relatively fast (e.g., fastest) response in order to come back to idle state as soon as possible (e.g., <2 s). Once LPF2 has had time to stabilize within a given tolerance range, it is set back to a relatively slow response and all other settings can be set back to default and the system can be put to sleep/idle mode waiting for a next interrupt. Generally, the device and/or involved units can be set to sleep/idle between any applicable steps in order to save power. The latter may be a scarce resource considering that the actual devices (e.g., 1, 1' or 1" as shown in conjunction with FIGS. 1A-C may be battery powered, or may draw their operating power from solar cells or other energy harvesting devices.

FIGS. 4A and 4B show schematic views of possible values of raw and processed data occurring during operation of corresponding embodiments of the present invention. Generally, the shown data in FIG. 4A represent a typical user story when a user (human) comes into the sensor's FOV and visits an exemplary restroom environment. The specific points in FIG. 4A are associated with the following events: (A) human enters FOV; (B) human passes by sensor at close range; (C) some activity and movement by human; (D) human stands up (e.g., washes hands); (E) human has left (i.e. absence).

Specifically, when a user (i.e. human) enters the FOV there may already be a downward drift (most likely to recent user activities), but the signal still responds and raises very quickly which is due to the fact that the user passes very close to the sensor at entry. When the user sits down in the edge of the sensor FOV the method may adjust to this and maintain a "presence" state. Then the user remains still inside the FOV, and a slow drift is to be expected, and the method will adjust the threshold Th accordingly. Here, LPF2 is a good approximation of how much the threshold is adjusted, i.e. it may follow the slow drift. When the user stands up, a much stronger signal can be observed, but the method may not adjust the threshold at the same high rate in this case. The main reason for this may be that if the threshold is pushed too high then the signal might drop below the elevated threshold too easily. This means that the LPF2 may rise much faster than the dynamic threshold.

When the user eventually leaves the FOV, the signal goes below the threshold and presence is judged to have ended (i.e. absence). Note here that the signal after presence may not be back to the same level as before user came into the FOV. This drift can however be handled by the dynamic threshold. Note also that LPF2 may take about a minute to reach the LPF1 level which is close to I, but in the method the time constant is changed, and the LPF2 will be equally fast as the LPF1 for the first steep drop, but both values will need a long time after this to drift down due to the elevated temperature of the front lens being dissipated. The system is however ready for a new user entering FOV.

Further, the difference between LPF2 and the threshold can be kept constant as long as LPF2 is changing slowly. For example, at point (D) when the user stands up and is close to the sensor the signal rises quickly. For generally compensating such situations the threshold can be limited in rising since the increase per time unit can be restricted. This can be generally employed in order to prevent strong changes in threshold that might lose presence detection. At the strong drops when e.g., the user leaves the room the signal goes below the threshold and then the threshold adjusting may not be continued as presence is no longer detected.

From this example it is clear that a fixed threshold algorithm may struggle to determine when a second user enters or has left, as the signal has drifted up significantly during the preceding user's presence period. It is noted that an accumulated drift after a second or further user can take considerable time, i.e. for example up to three minutes to dissipate which can be too long as compared to the expectable time periods in the context of visiting facilities such as restrooms. The proposed embodiments however can be able to determine both user presence and absence, which is of particular advantage in the context of counting people.

FIG. 4B shows a schematic view of possible values of raw and processed data occurring during operation of a corresponding embodiment of the present invention. Specifically, this embodiment refers to situations in which consecutive users visit a facility, e.g., a toilet. In this FIG. 4B the events are as follow: (A) a first user enters the FOV; (B) the first user passes the sensor; (C) the first user sits down; (D) the first user stands up and, e.g., washes hands; (E) the first user has left; (F) a second user enters the FOV; (G) the second user stands close to the sensor; (H) the second user sits down; (I) the second user stands up; (J) the second user has left. The shown scenario may be of particular use in demonstrating the advantages obtained by the embodiments of the present invention in reliably determining presences and absences and, as a consequence, in reliably counting. Specifically, the system can be rendered immune to a heating history (e.g., between points (A) and (E)) and immune to activities not related to a change in a present/absence state (e.g., points (B), (C), (D), etc.).

Although the above description may mention specifically a human, a person, an individual and a user, the described embodiments also apply for detecting absence and presence of and counting of creatures including animals and in general all warm objects, i.e. objects that may generate heat but at least radiate heat. Therefore, at least some embodiments can be useful in darkness as well as in light as, for example, in the case of counting wild animals at a feeding station during night when the animals are active and heat cameras might be too expensive and complicated to use to any large extent Further, and although detailed embodiments have been described, these only serve to provide a better understanding of the invention and are not to be seen as limiting.

The embodiments described above are only descriptions of preferred embodiments of the present invention, and are not intended to limit the scope of the invention. Various variations and modifications can be made to the technical solution of the present invention by those of ordinary skill in the art, without departing from the design of the present invention. The variations and modifications should all fall within the claimed scope defined by the claims of the invention.

What is claimed is:

1. A method for detecting presence and absence of a creature, the method comprising:
   receiving an input signal from a radiation sensor;
   applying a first low-pass filter to the input signal with a first time constant and generating a first filter output;
   applying a second low-pass filter to the received input signal with a second time constant and generating a second filter output;
   determining a presence of a creature by comparing a slope of the first filter output to a predetermined value;
   setting a first threshold based on the second filter output;
   decreasing the second time constant and thereafter waiting until the second filter output becomes equal to the first filter output within a predetermined tolerance;
   increasing the second time constant;
   calculating a difference between the first threshold and the second filter output;
   adjusting the first threshold based on the second filter output; and
   determining an absence when the first filter output falls below the first threshold.

2. The method according to claim 1, wherein the presence is determined by comparing the slope of the first filter output to a sum of the second filter output and a predetermined offset.

3. The method according to claim 2, further comprising:
   after decreasing the second time constant, one of the following steps:
   waiting for a predetermined time; and
   waiting until the second filter output becomes equal to the first filter output within a predetermined tolerance;
   wherein adjusting the first threshold based on the second filter output is for the first filter output to follow the second filter output within a predetermined tolerance;
   wherein adjusting the first threshold based on the second filter output includes limiting the threshold to a maximum value;
   wherein determining a presence includes determining a start of the presence of the creature;
   wherein determining an absence includes determining an end of the presence of the creature; and
   further comprising: counting creatures by considering one or more determined presences and/or one or more determined absences.

4. The method according to claim 1, further comprising, after decreasing the second time constant:
   waiting for a predetermined time.

5. The method according to claim 1, wherein adjusting the first threshold based on the second filter output is for the first filter output to follow the second filter output within a predetermined tolerance.

6. The method according to claim 1, wherein adjusting the first threshold based on the second filter output includes limiting the threshold to a maximum value.

7. The method according to claim 1, wherein determining a presence includes determining a start of the presence of the creature.

8. The method according to claim 1, wherein determining an absence includes determining an end of the presence of the creature.

9. The method according to claim 1, further comprising:
   counting creatures by considering one or more determined presences and/or one or more determined absences.

10. A device for detecting presence and absence of a creature, the device comprising processing resources that are adapted to:
    receive an input signal from a radiation sensor;
    apply a first low-pass filter to the input signal with a first time constant and to generate a first filter output;
    apply a second low-pass filter to the received input signal with a second time constant and to generate a second filter output;
    determine a presence of a creature by comparing a slope of the first filter output to a predetermined value;
    set a first threshold based on the second filter output;
    decrease the second time constant;
    increase the second time constant;
    calculate a difference between said first threshold and the second filter output;
    adjust said first threshold based on the second filter output; and to determine an absence when the first filter output falls below said first threshold,
    wherein said processing resources are adapted to also:
    after decreasing the second time constant, perform one of the following steps:
    waiting for a predetermined time; and
    waiting until the second filter output becomes equal to the first filter output within a predetermined tolerance.

11. The device according to claim 10, wherein said radiation sensor is selected as one of: an infrared sensor, a thermopile sensor, a camera, an optical sensor, and a temperature sensor.

12. The device according to claim 11, wherein said radiation sensor is a thermopile with a field of view of 5° and below, and further comprising said radiation sensor.

13. The device according to claim 10, wherein said radiation sensor is a thermopile with a field of view of 5° and below.

14. The device according to claim 10, further comprising said radiation sensor.

15. The device according to claim 10, wherein said processing resources are adapted to also:
determine the presence by comparing the slope of the first filter output to a sum of the second filter output and a predetermined offset.

16. The device according to claim 10, wherein said processing resources are adapted to also:
determine a start of the presence of the creature.

17. The device according to claim 10, wherein said processing resources are adapted to also:
determine an end of the presence of the creature.

18. A method for detecting presence and absence of a creature, the method comprising:
receiving an input signal from a radiation sensor;
applying a first low-pass filter to the input signal with a first time constant and generating a first filter output;
applying a second low-pass filter to the received input signal with a second time constant and generating a second filter output;
determining a presence of a creature by comparing a slope of the first filter output to a predetermined value, wherein the presence is determined by comparing the slope of the first filter output to a sum of the second filter output and a predetermined offset;
setting a first threshold based on the second filter output;
decreasing the second time constant and thereafter waiting until the second filter output becomes equal to the first filter output within a predetermined tolerance;
increasing the second time constant;
calculating a difference between the first threshold and the second filter output;
adjusting the first threshold based on the second filter output;
determining an absence when the first filter output falls below the first; and
after decreasing the second time constant, performing one of the following steps:
waiting for a predetermined time; and
waiting until the second filter output becomes equal to the first filter output within a predetermined tolerance,
wherein adjusting the first threshold based on the second filter output is for the first filter output to follow the second filter output within a predetermined tolerance,
wherein adjusting the first threshold based on the second filter output includes limiting the threshold to a maximum value,
wherein determining a presence includes determining a start of the presence of the creature,
wherein determining an absence includes determining an end of the presence of the creature; and
further comprising: counting creatures by considering one or more determined presences and/or one or more determined absences.

* * * * *